United States Patent [19]
Kato et al.

[11] Patent Number: 5,730,546
[45] Date of Patent: Mar. 24, 1998

[54] STRUCTURE FOR CENTERING AND CONNECTING BETWEEN MEMBERS

[75] Inventors: Hiroyuki Kato; Shuichiro Honda, both of Kanagawa-ken, Japan

[73] Assignee: Ebara Corporation, Tokyo, Japan

[21] Appl. No.: 660,580

[22] Filed: Jun. 11, 1996

[30] Foreign Application Priority Data

Jun. 14, 1995 [JP] Japan ................................ 7-172753

[51] Int. Cl.⁶ .................................................. F16C 33/06
[52] U.S. Cl. .......................... 403/404; 403/179; 403/372; 403/28; 403/365
[58] Field of Search ................................ 403/30, 28, 404, 403/365, 372, 371, 179; 384/905, 557, 493, 278, 535, 581

[56] References Cited

U.S. PATENT DOCUMENTS

| | | | |
|---|---|---|---|
| 1,370,599 | 3/1921 | Leon | 384/535 X |
| 1,370,639 | 3/1921 | Fjellman | 403/371 |
| 2,239,641 | 4/1941 | Bierend | 277/209 |
| 2,919,940 | 1/1960 | Anderson | 403/365 |
| 3,467,451 | 9/1969 | Marley | 384/215 |
| 4,098,476 | 7/1978 | Jutte et al. | 403/30 X |
| 4,281,941 | 8/1981 | Rottenkolber | 403/404 X |
| 4,325,647 | 4/1982 | Maier et al. | 403/404 X |
| 4,848,935 | 7/1989 | Seibig et al. | 403/30 X |
| 5,020,828 | 6/1991 | Ciokajlo et al. | 384/493 X |
| 5,020,932 | 6/1991 | Boyd | 403/30 |
| 5,039,231 | 8/1991 | Kispert et al. | 384/572 |
| 5,308,183 | 5/1994 | Stegeman et al. | 403/371 X |

FOREIGN PATENT DOCUMENTS

| | | | |
|---|---|---|---|
| 239641 | 10/1986 | Germany | 384/278 |
| 239642 | 10/1986 | Germany | 384/278 |
| 43 07 004 | 9/1994 | Germany . | |
| 844844 | 7/1981 | U.S.S.R. | 384/278 |

OTHER PUBLICATIONS

"Curvic Coupling Device", Gleason, pp. 1–23, in particular p. 18, lines 12–17, 1964, Rochester, New York.

*Primary Examiner*—Anthony Knight
*Attorney, Agent, or Firm*—Wenderoth, Lind & Ponack

[57] ABSTRACT

A structure for centering and connecting two members includes a first member having an engagement opening, and a second member having an engagement projection which has an outer peripheral surface substantially corresponding to an inner peripheral surface of the engagement opening. Small protrusions extend radially outwardly and are equidistantly disposed along a circumferential direction on the outer peripheral surface of the engagement projection. Straight notches are formed in the outer peripheral surface on both axial sides of each small protrusion to provide elasticity. When the engagement projection is fitted into the engagement opening, the small protrusions are elastically urged against the inner peripheral surface of the engagement opening. In this way, even when the two members have different thermal expansions, no play or no excessive stress is generated between the two members.

42 Claims, 7 Drawing Sheets

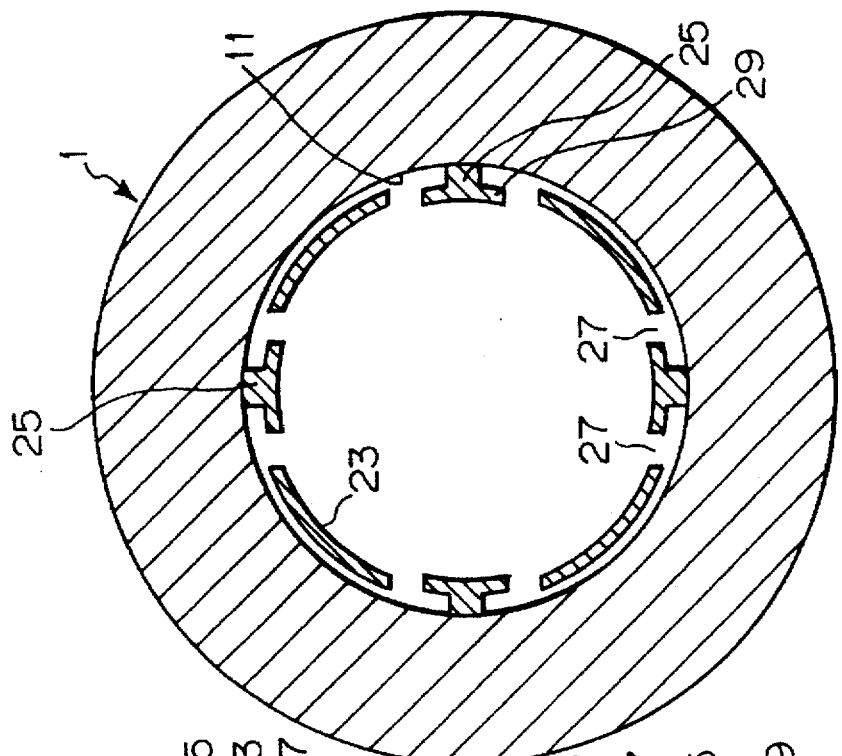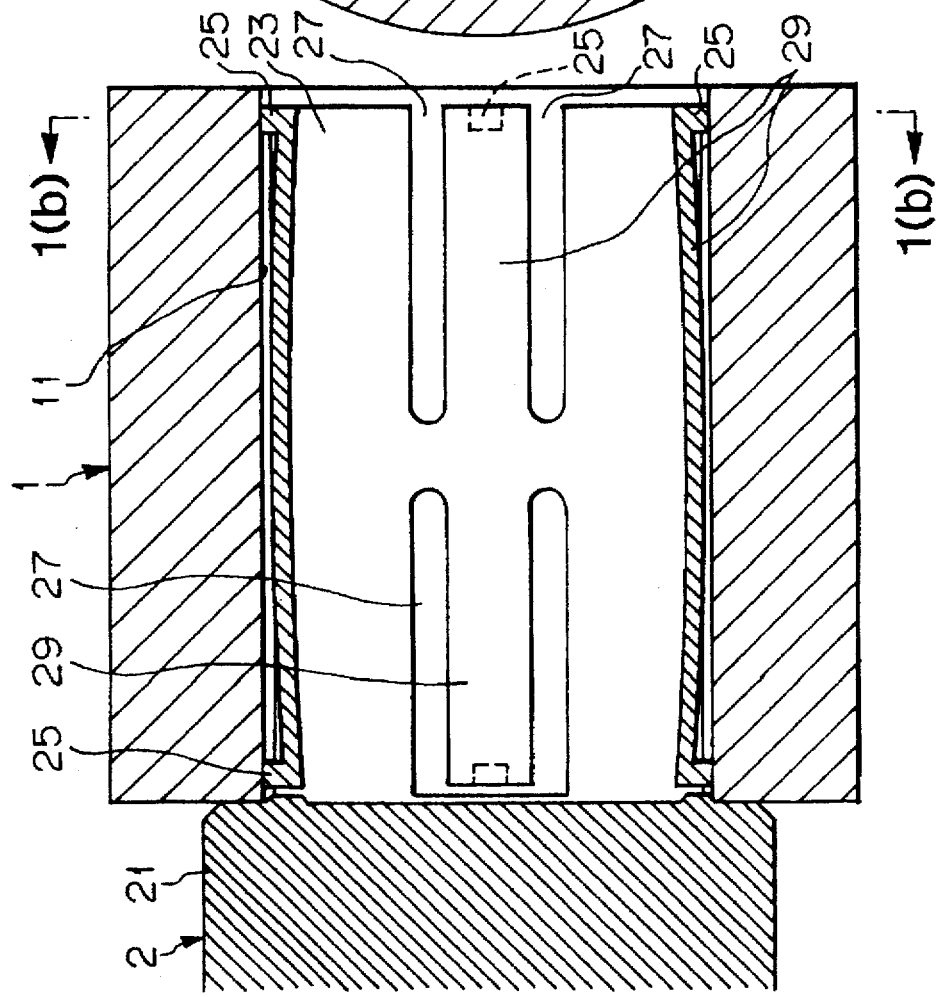

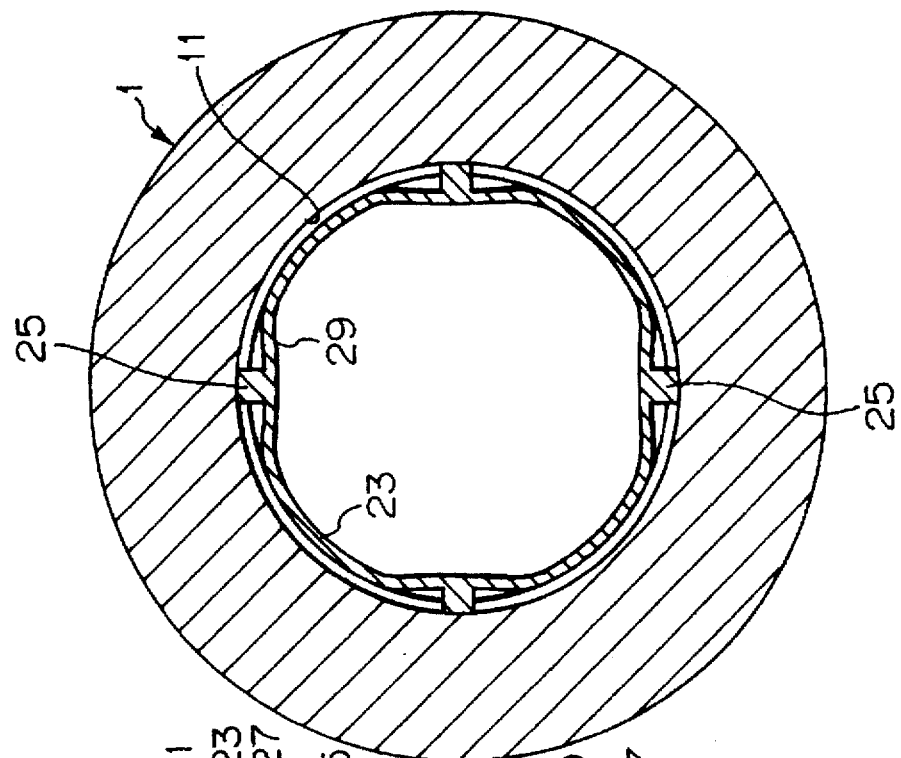
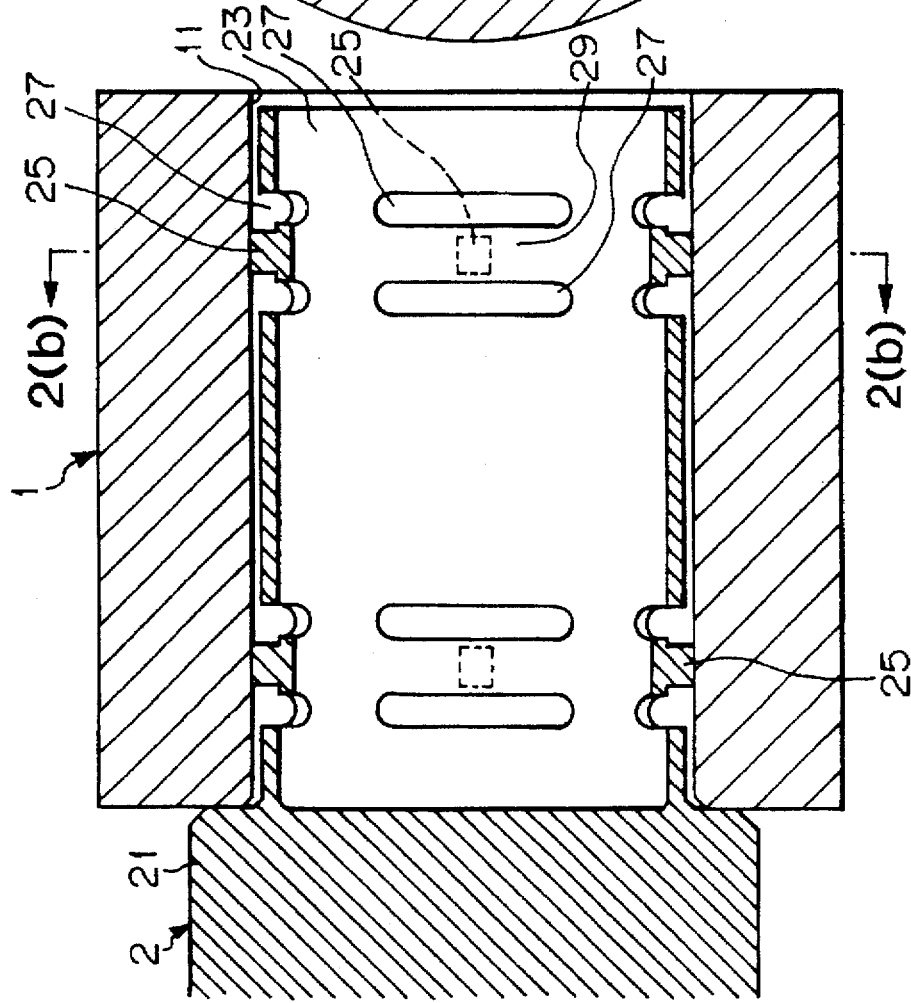

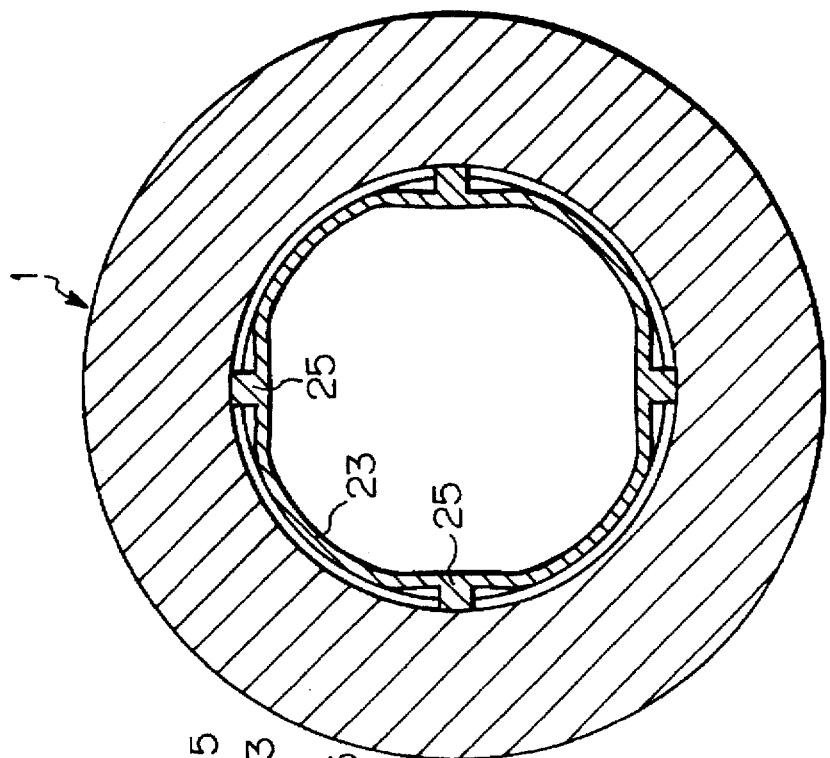
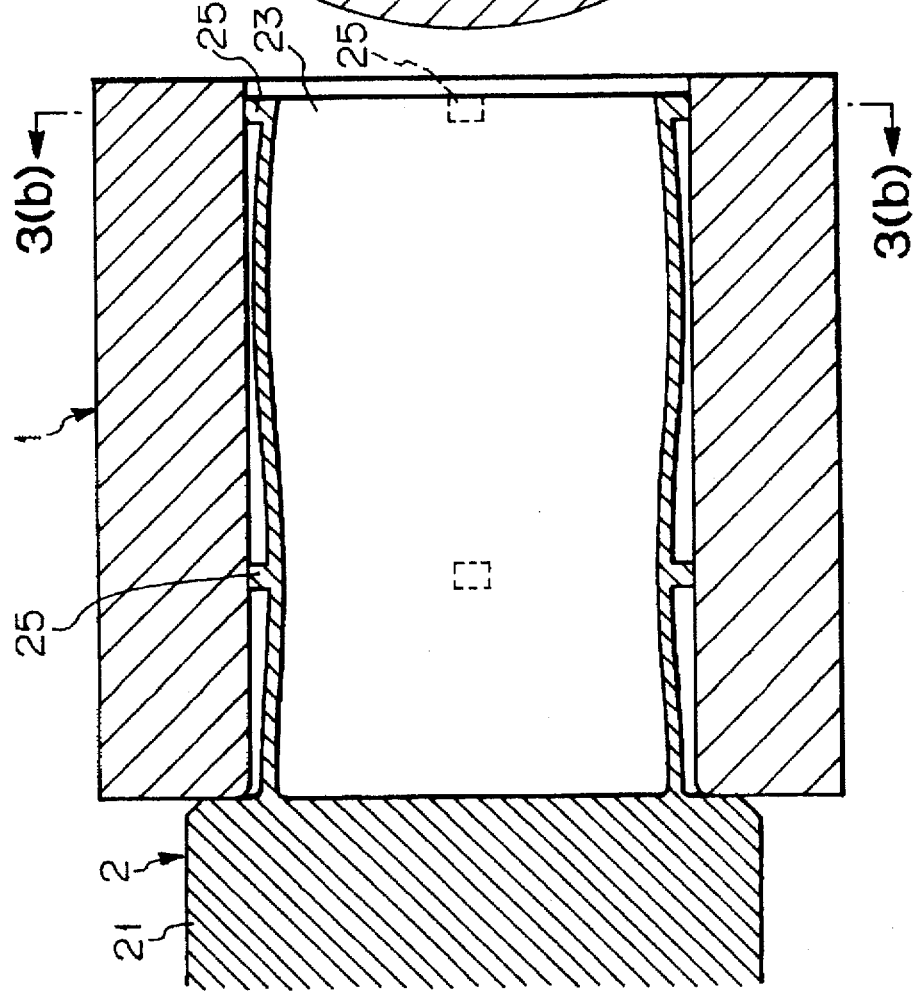

STRUCTURE FOR CENTERING AND CONNECTING BETWEEN MEMBERS

BACKGROUND OF THE INVENTION

1. Field of the Invention

The present invention relates to a centering and connecting structure for centering and connecting two members, in which, even when two members which have different levels of thermal expansion are interconnected, no play is generated between them.

2. Prior Arts

When two members made of different materials are centered and interconnected by an appropriate means, there arises a problem that play may be created between the members or excessive contact pressure may be generated between the members due to a difference in the levels of thermal expansion.

To eliminate such a problem, there have been proposed radial-key structures and a Curvic coupling.

As shown in FIG. 7, in a typical radial-key structure, a connecting surface (interface) 203 of one member 201 is provided with radial straight projections 205, and a connecting surface 209 of the other member 207 is provided with radial straight grooves (not shown) capable of being engaged by the corresponding straight projections 205 so that, when the connecting surfaces 203, 209 are closely contacted with each other, the members can be centered with respect to each other, and the members 201, 207 are secured to each other by an appropriate securing means (not shown).

In this case, if a difference in expansion or contraction occurs between the members 201, 207 due to heat or the like, the expansion or contraction difference can be absorbed without any change in centering since the radial straight projections 205 can be shifted along the respective radial straight grooves in response to the amount of expansion or contraction.

On the other hand, in the Curvic coupling, as shown in FIG. 8, connecting surfaces 215, 217 of two members 211, 213 are provided with radial teeth 219 (not shown regarding the connecting surface 217) disposed along a circumferential direction of the members so that, the radial teeth 219 of the two members are engaged by each other, the members can be centered with respect to each other, and the members 211, 213 are secured to each other by an appropriate securing means (not shown).

Also in this case, the expansion or contraction difference between the members 211, 213 can be absorbed without any change in centering due to the relative shifting movement of the radial teeth 219 between the members.

(Problems Which the Invention is to Solve)

However, in the above-mentioned conventional techniques, there is no self-fixing ability for firmly interconnecting two members, and, thus an additional fixing means is required to interconnect two members firmly. Further, some play may be generated due to differences in thermal expansion (or contraction) between the members.

In addition, the above-mentioned conventional structures are difficult to manufacture and require much time and cost.

SUMMARY OF THE INVENTION

The present invention aims to eliminate the above-mentioned conventional drawbacks, and an object of the present invention is to provide a structure for centering and connecting two members, in which, even when two members having different levels of thermal expansion are interconnected, no play and no excessive pressure are generated and centering between the members can be easily attained, and which is simple in construction and can be easily manufactured.

(Means for Solving the Problems)

To achieve the above object, according to the present invention, there is provided a centering and connecting mechanism comprising a first member including an engagement opening, and a second member including an engagement projection having an outer peripheral surface substantially corresponding to an inner peripheral surface of the engagement opening and a dimension slightly smaller than that of the engagement opening and further having an inner cavity, and wherein the outer peripheral surface of the engagement projection of the second member is provided with a plurality of small protrusions protruding radially outwardly and equidistantly disposed around the outer peripheral surface or the inner peripheral surface of the engagement opening of the first member is provided with a plurality of small protrusions protruding radially inwardly and equidistantly disposed around the inner peripheral surface so that, when the engagement projection of the second member is fitted into an engagement opening of the first member, the small protrusions are elastically urged against the member having no small protrusions by an elastic force of the engagement projection of the second member, thereby centering and connecting the first and second members.

(Operation of the Invention)

When the engagement projection of the second member is fitted into an engagement opening of the first member, due to the elastic force of the engagement projection of the second member, the small protrusions elastically abut against the first and second members. In this case, since the small protrusions are equidistantly disposed along the circumferential direction, a central axis of the engagement opening is automatically aligned with a central axis of the engagement projection, thereby achieving proper centering.

Further, according to the present invention, since the engagement projection of the second member is prestressed by the urging forces of the small protrusions, even if a difference in the amount of thermal expansion is generated between the first and second members, since the prestress of the engagement projection is merely increased or decreased and the elastic abutment of the small protrusions is still maintained, no play or no excessive stress is generated between the first and second members.

BRIEF DESCRIPTION OF THE DRAWINGS

FIG. 1(a) is an elevational sectional view showing a preferred embodiment of the present invention, and FIG. 1(b) is a sectional view taken along the line 1(b)—1(b) in FIG. 1(a);

FIG. 2(a) is an elevational sectional view showing another embodiment of the present invention, and FIG. 2 (b) is a sectional view taken along the line 2(b)—2(b) in FIG. 2(a);

FIG. 3(a) is an elevational sectional view showing a further embodiment of the present invention, and FIG. 3(b) is a sectional view taken along the line 3(b)—3(b) in FIG. 3(a);

DETAILED DESCRIPTION OF THE PREFERRED EMBODIMENTS

Figure 4:
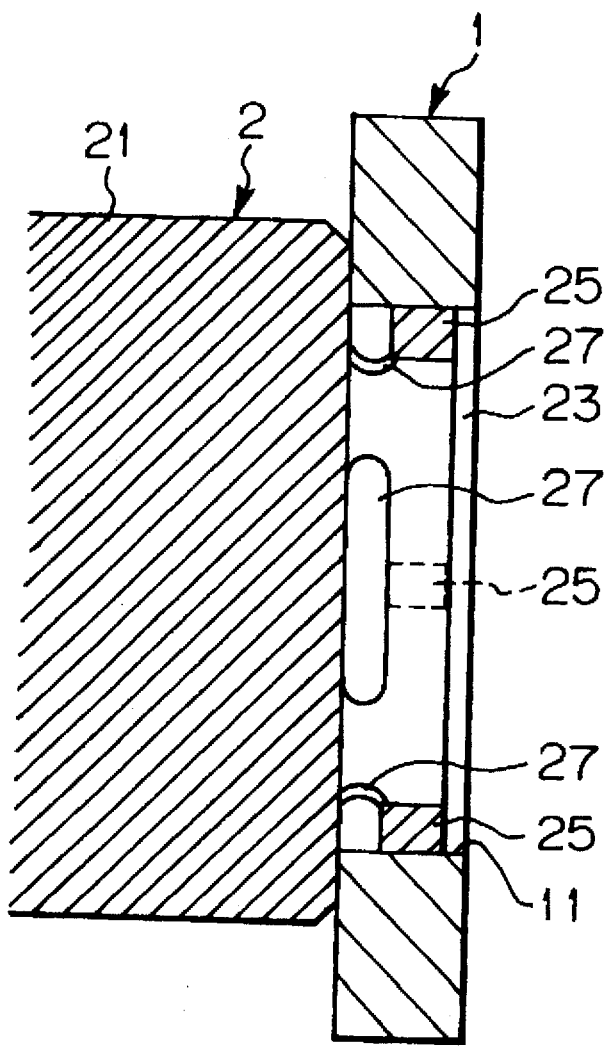
FIG. 4 is a partial elevational sectional view showing a still further embodiment of the present invention.

The present invention will now be explained in connection with embodiments thereof with reference to the accompanying drawings.

FIGS. 1(a) and 1(b) show a main part of a structure for centering and connecting two members, according to a preferred embodient of the present invention, where FIG. 1(a) is an elevational sectional view of the structure, and FIG. 1(b) is a sectional view taken along the line 1(b)—1(b) in FIG. 1(a).

In this embodiment, centering and connecting between first member 1 and a second member 2 are effected by fitting an engagement projection 23 provided on the second member 2 into an engagement opening 11 formed in the first member 1. Such members now will be fully described.

The first member 1 has a cylindrical shape. Thus, the first member 1 has therethrough central engagement opening (through bore) 11.

The second member 2 has substantially cylindrical engagement projection 23 protruded from a body 21 and having an inner cavity. An outer peripheral surface of the engagement projection 23 has a diameter slightly smaller than that of an inner peripheral surface of the engagement opening 11.

Further, at distal and proximal ends of the engagement projection 23, there are provided four small protrusions 25 equidistantly disposed along a circumferential direction and protruding radially outwardly.

The small protrusions 25 have the same height, and an outer diameter formed by tip or free ends of the small protrusions 25 is slightly smaller than an inner diameter of the engagement opening 11.

Further, straight axial notches 27 are provided on both sides of each small protrusion 25 so that an elastic tongue 29 including each small protrusion 25 is defined between the associated notches 27.

As shown in FIG. 1, when the engagement projection 23 of the second member 2 is fitted into the engagement opening 11 of the first member 1, the small protrusions 25 are strongly urged against the inner peripheral surface of the engagement opening 11 by elastic forces of the elastic tongues 29.

In this case, since the small protrusions 25 are equidistantly disposed along the circumferential direction, a central axis of the first member 1 is automatically aligned with a central axis of the second member 2, thereby achieving the centering between the first and second members without using any adjusting means.

If the first and second members are made of different materials or if there is great difference in temperature applied between the first and second members made of the same material, there will be a difference in the level of thermal expansion (or contraction) between the first and second members.

However, according to the illustrated embodiments, since a prestress is applied to the engagement projection by the elastic displacement of the elastic tongues 29, for example, if the difference in thermal expansion causes an increase in a gap between the engagement opening 11 and the engagement projection 23, the elastic engagement between the small protrusions 25 and the inner peripheral surface of the engagement opening 11 of the first member 1 is maintained by decreasing prestress, thereby preventing play from occurring between the first and second members. On the other hand, if the difference in thermal expansion causes a decrease in the gap between the engagement opening 11 and the engagement projection 23, the difference can be absorbed by the elastic deformation of the elastic tongues 29, thereby preventing excessive stress from occurring between the first and second members.

Incidentally, in order to firmly connect the first and second members, the first and second members may be interconnected by using keys and the like.

Next, another embodiment of the present invention will be explained. FIGS. 2(a) and 2(b) show a main part of a structure for centering and connecting two members, according to another embodiment of the present invention, where FIG. 2(a) is an elevational sectional view of the structure, and FIG. 2(b) is a sectional view taken along the line 2(b)—2(b) in FIG. 2(a). Incidentally, the same elements as those of the first embodiment shown in FIG. 1 are designated by the same reference numerals and detailed explanation thereof will be omitted. The difference between the embodiment shown in FIGS. 2(a)–2(b) and the embodiment shown in FIGS. 1(a)–1(b) is shapes of small protrusions 25 and notches 27 provided on the engagement projection 23 of the second member 2.

That is to say, in the embodiment shown in FIGS. 2(a)–2(b), four small protrusions 25 having the same height are equidistantly disposed around the outer peripheral surface of the engagement projection at positions slightly inside of the axial distal and proximal ends of the engagement projection 23, respectively, and slot-shaped notches 27 are formed in the engagement projection on both axial sides of each small protrusion 25, thereby defining an elastic tongue 29.

Also with this arrangement, when the engagement projection 23 of the second member 2 is fitted into the engagement opening 11 of the first member 1, the small protrusions 25 are strongly urged against the inner peripheral surface of the engagement opening 11 by elastic forces of the elastic tongues 29, thereby achieving the centering and the connection between the first and second members. At the same time, even if a difference in thermal expansion (or contraction) occurs between the first and second members, such a difference can be absorbed, thereby preventing the occurrence of the play or excessive stress.

Next, a further embodiment of the present invention will be explained. FIGS. 3(a) and 3(b) show a main part of a structure for centering and connecting two members, according to a further embodiment of the present invention, where FIG. 3(a) is an elevational sectional view of the structure, and FIG. 3(b) is a sectional view taken along the line 3(b)—3(b) in FIG. 3(a). Incidentally, the same elements as those of the first embodiment shown in FIGS. 1(a)–1(b) are designated by the same reference numerals and detailed explanation thereof will be omitted.

The embodiment shown in FIGS. 3(a)–3(b) differs from the embodiment shown in FIGS. 1(a)–1(b) in the point that there are no notches 27 associated with the small protrusions 25, and the small protrusions 25 are provided on the cylindrical engagement projection 23.

That is to say, in dependence upon the material of the second member 2 and/or a thickness of the engagement projection 23, even when the notches 27 are not formed on the engagement projection, a radial urging force can be applied to the small protrusions 25 by the elastic force of the engagement projection 23 itself. Accordingly, also with this arrangement, when the engagement projection 23 of the second member 2 is fitted into the engagement opening 11 of the first member 1, the small protrusions 25 are strongly urged against the inner peripheral surface of the engagement opening 11 by elastic forces from the material of engagement projection 23, thereby achieving centering and the connection between the first and second members. At the same time, even if a difference in thermal expansion (or contraction) occurs between the first and second members, such difference can be absorbed, thereby preventing the occurrence of play or excessive stress.

Next, a still further embodiment of the present invention in which an engagement projection 23 is shortened will be explained with reference to FIG. 4. FIG. 4 is an elevational sectional view showing a main part of a centering and connecting structure according to a still further embodiment of the present invention. Incidentally, the same elements as those of the embodiments shown in FIGS. 1(a)–2(b) are designated by the same reference numerals and detailed explanation thereof will be omitted.

In the embodiment shown in FIG. 4, four notches 27 extending in the circumferential direction and equidistantly arranged along the circumferential direction are formed in a proximal end portion of a cylindrical engagement projection 23 of the second member 2, and four small protrusions 25 protruding outwardly are equidistantly formed on the outer peripheral surface of the engagement projection 23 at positions corresponding to centers of the notches 27 and nearer the distal end of the projection. The engagement projection 23 is fitted into an engagement opening 11 of a ring-shaped first member 1.

Figure 5:
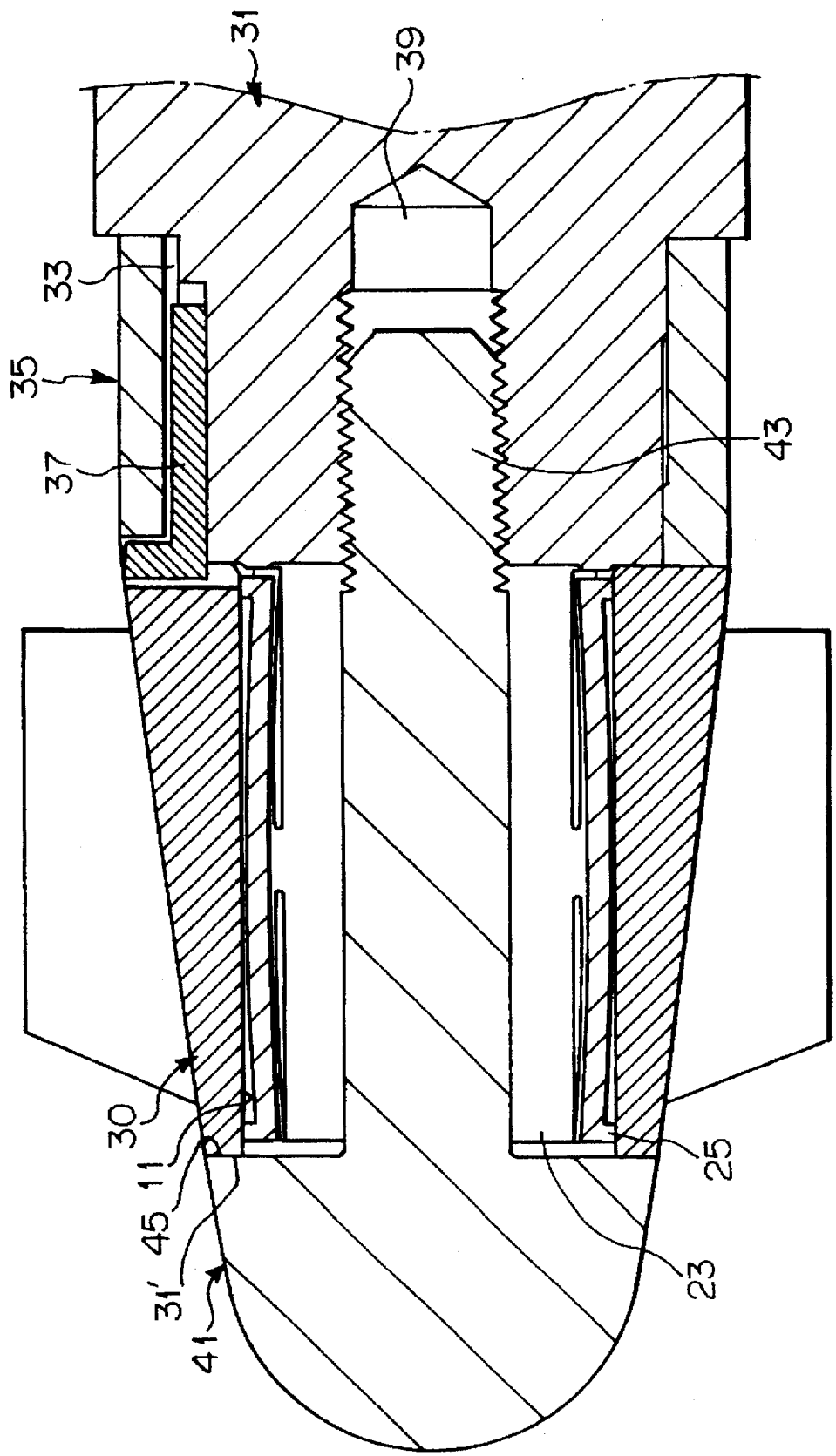
FIG. 5 is an elevational sectional view showing a concrete example of the present invention.

FIG. 5 is a sectional view showing a concrete example of the embodiment shown in FIGS. 1(a)–1(b) actually applied to effect the centering and connecting of a rotary member of a pump.

In the example shown in FIG. 5, a first-stage vane rotor 30 corresponds to the first member and a shaft 31 corresponds to the second member.

The rotary member is assembled by firstly inserting a second-stage vane rotor 35 (vanes are omitted from illustration) onto a stepped portion 33 of the shaft 31, then by fitting an engagement opening 11 of the first-stage vane rotor 30 onto an outer peripheral surface of an engagement projection 23 (similar to that shown in FIGS. 1(a)–1(b)) provided on the tip end of the shaft 31, then by integrally securing the shaft 31 and the first-stage and second-stage vane rotors 30, 35 together by means of keys 37, then by engaging a shoulder 45 of a cap 41 with an end surface 31' of the vane rotor 30, and by lastly tightening a threaded portion 43 of the cap 41 into a threaded hole 39 formed in an end surface of the shaft 31.

In this case, only by fitting the first-stage vane rotor 30 onto the shaft 31, the centering and the connection between these elements can be achieved simultaneously. Incidentally the reason why the shaft 31 and the first-stage and second-stage vane rotors 30, 35 are secured to each other by means of keys 37 is that strong torque transmitting forces between these elements can be obtained.

The shaft 31 is made of metal and the first-stage vane rotor 30 is made of ceramic. Thus, when the rotary member is subjected to high temperatures, a difference in amount of thermal expansion occurs between the shaft and the vane rotor. However, as mentioned above, since such a difference is absorbed by the engagement opening 11 and the engagement projection 23, no play or no excessive stress is generated between the shaft and the vane rotor.

Figure 6:
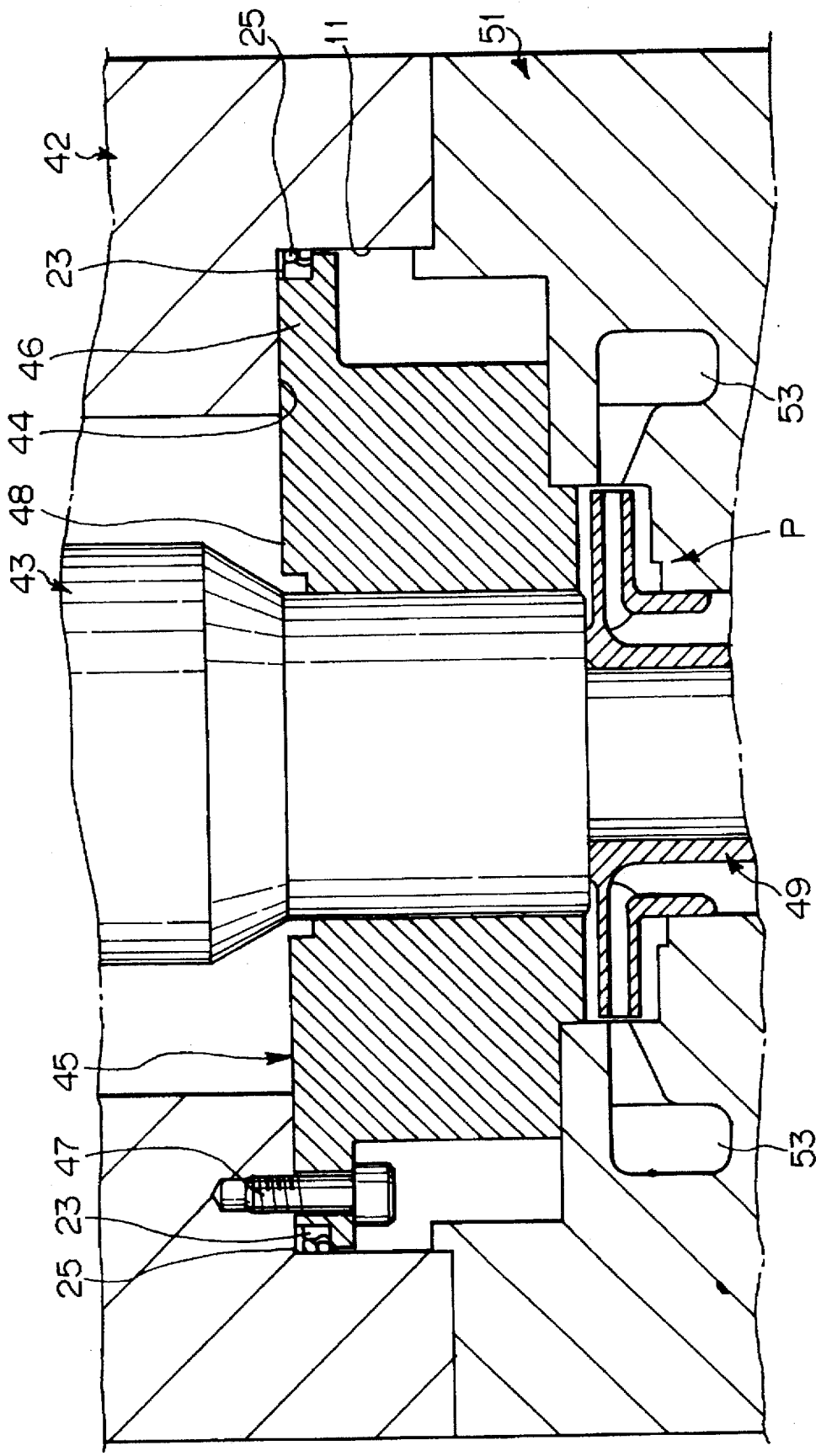
FIG. 6 is an elevational sectional view showing another concrete example of the present invention.
Figure 7:
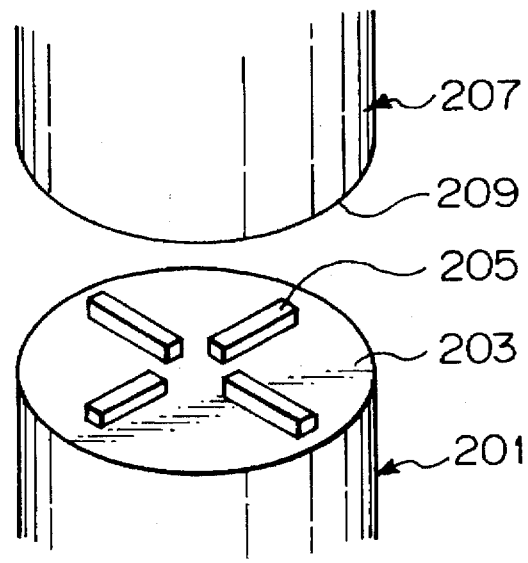
FIG. 7 is a perspective view showing a conventional technique.

FIG. 6 is a sectional view showing a concrete example of the embodiment shown in FIG. 4 actually applied to effect the centering and connecting of a stationary member of a pump.

In the example shown in FIG. 6, a first fixed member 42 corresponds to the first member and a shaft support member 45 for supporting a shaft 43 corresponds to the second member.

In this example, the centering and connection between the shaft 43 and the first fixed member 42 is effected by fitting an engagement projection 23 provided on a disc portion 46 of the shaft support member 45 for rotatably supporting the shaft 43 into a concave engagement opening 11 formed in the first fixed member 42. Further, in order to firmly secure the shaft support member 45 and the first fixed member 42, bolt 47 are used to firmly engage an end surface 48 of the disc portion 46 with a shoulder portion 44 of the engagement opening. The a vane rotor 49 is secured to a tip end of the shaft 43, and, lastly, a second fixed member 51 is secured to the first fixed member 42 by a fixing means (not shown).

Discharge ports 53 are formed in the second fixed member 51, and combination of the second fixed member and the vane rotor 49 defines a pump P.

In this example, although the first fixed member 42 and the shaft support member 45 are made of same metallic material, since high temperature (for example, 500° C.) fluid flows through the pump P, there is considerable difference in heating temperature between the members 42, 45, thereby generating a difference in thermal expansion between these members. However, as mentioned above, such difference is absorbed by the engagement opening 11 and the engagement projection 23, and no play or no excessive stress is generated between the shaft and the vane rotor. Of course, there is no out of center.

In the above-mentioned embodiments, while the small protrusions 25 are formed on the outer peripheral surface of the engagement projection 23 of the second member 2, alternatively, a plurality of small protrusions protruding inwardly and equidistantly disposed along a circumferential direction may be formed on the inner peripheral surface of the engagement opening 11 of the first member 1.

As mentioned above, according to the present invention, the following excellent advantages can be obtained:

(1) Even when two members having different levels of thermal expansion (or contraction) are connected to each other, no play or no excessive stress is generated.

(2) Centering and connection between two members can be easily achieved, and, even if a difference in thermal expansion (or contraction) is generated between two members, out-of-centering does not occur.

(3) The structure is simple and can be easily assembled.

What is claimed is:

1. A centering and connecting structure wherein an engagement projection formed on a second member is fitted into an engagement opening formed in a first member, whereby a central axis of said engagement opening is aligned with a central axis of said engagement projection and the alignment is always maintained regardless of any difference between thermal expansions of said first and second members, said structure further comprising:

said engagement projection having an outer peripheral surface substantially corresponding to an inner peripheral surface of said engagement opening and having a dimension slightly smaller than that of said engagement opening, and said engagement projection having an inner cavity providing said engagement projection with radial elasticity;

two sets of small protrusions, said sets being spaced axially of said central axes, each said set including a plurality of said small protrusions extending radially from said outer peripheral surface of said engagement projection of said second member and equidistantly circumferentially spaced around said outer peripheral surface, so that, when said engagement projection is inserted into said engagement opening, free ends of said small protrusions are elastically urged against said inner peripheral surface of said engagement opening in said first member by the elasticity of said engagement projection; and portions of said outer peripheral surface supporting said small protrusions having therein notches providing said radial elasticity, respective said notches being provided on opposite sides of each of said small protrusions, said notches extending circumferentially only.

2. A centering and connecting structure according to claim 1, wherein said engagement projection has a radial thickness at each said small protrusion that is greater than a radial thickness of all portions of said engagement projection not having small protrusions.

3. A centering and connecting structure according to claim 1, wherein said first and second members are fixed relative to each other axially by urging an end surface of one of said first and second members against a shoulder portion on the other of said first and second members.

4. A centering and connecting structure according to claim 1, wherein said first and second members are fixed relative to each other circumferentially by a key, thereby enabling a strong torque to be imparted between said first and second members.

5. A centering and connecting structure according to claim 1, wherein said engagement opening of said first member is an engagement opening of a vane rotor, and said engagement projection of said second member is an engagement projection provided on a tip end of a shaft, and further comprising a cap having a shoulder portion engaged with an end surface of said vane rotor and a threaded portion threaded into a threaded hole formed in an end surface of said shaft.

6. A centering and connecting structure according to claim 1, wherein said engagement opening of said first member is an engagement opening of a first fixed member of a pump, and said engagement projection of said second member is an engagement projection formed in a disc portion of a shaft support member for supporting a shaft, and an end surface of said disc portion of said shaft support member being urged and fixed against a shoulder portion of said engagement opening by bolts passing through said disc portion and threaded into threaded holes of said first fixed member.

7. A centering and connecting structure wherein an engagement projection formed on a second member is fitted into an engagement opening formed in a first member, whereby a central axis of said engagement opening is aligned with a central axis of said engagement projection and the alignment is always maintained regardless of any difference between thermal expansions of said first and second members, said structure further comprising:

said engagement projection having an outer peripheral surface substantially corresponding to an inner peripheral surface of said engagement opening and having a dimension slightly smaller than that of said engagement opening, and said engagement projection having an inner cavity providing said engagement projection with radial elasticity;

two sets of small protrusions, said sets being spaced axially of said central axes, each said set including a plurality of said small protrusions extending radially from said outer peripheral surface of said engagement projection of said second member and equidistantly circumferentially spaced around said outer peripheral surface, so that, when said engagement projection is inserted into said engagement opening, free ends of said small protrusions are elastically urged against said inner peripheral surface of said engagement opening in said first member by the elasticity of said engagement projection;

said engagement projection having a radial thickness at each said small protrusion that is greater than a radial thickness of all portions of said engagement projection not having small protrusions; and portions of said outer peripheral surface supporting said small protrusions having therein notches providing said radial elasticity, respective said notches being provided on opposite sides of each of said small protrusions.

8. A centering and connecting structure according to claim 7, wherein said notches extend axially only.

9. A centering and connecting structure according to claim 7, wherein said first and second members are fixed relative to each other axially by urging an end surface of one of said first and second members against a shoulder portion on the other of said first and second members.

10. A centering and connecting structure claim 7, wherein said first and second members are fixed relative to each other circumferentially by a key, thereby enabling a strong torque to be imparted between said first and second members.

11. A centering and connecting structure according to claim 7, wherein said engagement opening of said first member is an engagement opening of a vane rotor, and said engagement projection of said second member is an engagement projection provided on a tip end of a shaft, and further comprising a cap having a shoulder portion engaged with an end surface of said vane rotor and a threaded portion threaded into a threaded hole formed in an end surface of said shaft.

12. A centering and connecting structure according to claim 7, wherein said engagement opening of said first member is an engagement opening of a first fixed member of a pump, and said engagement projection of said second member is an engagement projection formed in a disc portion of a shaft support member for supporting a shaft, and an end surface of said disc portion of said shaft support member being urged and fixed against a shoulder portion of said engagement opening by bolts passing through said disc portion and threaded into threaded holes of said first fixed member.

13. A centering and connecting structure wherein an engagement projection formed on a second member is fitted into an engagement opening formed in a first member, whereby a central axis of said engagement opening is aligned with a central axis of said engagement projection and the alignment is always maintained regardless of any difference between thermal expansions of said first and second members, said structure further comprising:

said engagement projection having an outer peripheral surface substantially corresponding to an inner peripheral surface of said engagement opening and having a dimension slightly smaller than that of said engagement opening, and said engagement projection having an inner cavity providing said engagement projection with radial elasticity; and two sets of small protrusions, said sets being spaced axially of said central axes, each said set including a plurality of said small protrusions extending radially from said outer peripheral surface of said engagement projection of said second member and equidistantly circumferentially spaced around said outer peripheral surface, so that, when said engagement projection is inserted into said engagement opening, free ends of said small protrusions are elastically urged against said inner surface of said engagement opening in said first member by the elasticity of said engagement projection, portions of said outer peripheral surface supporting said small protrusions having therein notches providing said radial elasticity, said notches extending circumferentially only.

14. A centering and connecting structure according to claim 13, wherein said engagement projection has a radial thickness at each said small protrusion that is greater than a radial thickness of all portions of said engagement projection not having small protrusions.

15. A centering and connecting structure according to claim 13, wherein said first and second members are fixed relative to each other axially by urging an end surface of one of said first and second members against a shoulder portion on the other of said first and second members.

16. A centering and connecting structure according to claim 13, wherein said first and second members are fixed relative to each other circumferentially by a key, thereby enabling a strong torque to be imparted between said first and second members.

17. A centering and connecting structure according to claim 13, wherein said engagement opening of said first member is an engagement opening of a vane rotor, and said engagement projection of said second member is an engagement projection provided on a tip end of a shaft, and further comprising a cap having a shoulder portion engaged with an end surface of said vane rotor and a threaded portion threaded into a threaded hole formed in an end surface of said shaft.

18. A centering and connecting structure according to claim 13, wherein said engagement opening of said first member is an engagement opening of a first fixed member of a pump, and said engagement projection of said second member is an engagement projection formed in a disc portion of a shaft support member for supporting a shaft, and an end surface of said disc portion of said shaft support member being urged and fixed against a shoulder portion of said engagement opening by bolts passing through said disc portion and threaded into threaded holes of said first fixed member.

19. A centering and connecting structure wherein an engagement projection formed on a second member is fitted into an engagement opening formed in a first member, whereby a central axis of said engagement opening is aligned with a central axis of said engagement projection and the alignment is always maintained regardless of any difference between thermal expansions of said first and second members, said structure further comprising:

said engagement projection having an outer peripheral surface substantially corresponding to an inner peripheral surface of said engagement opening and having a dimension slightly smaller than that of said engagement opening, and said engagement projection having an inner cavity providing said engagement projection with radial elasticity; and two sets of small protrusions, said sets being spaced axially of said central axes, each said set including a plurality of said small protrusions extending radially from said outer peripheral surface of said engagement projection of said second member and equidistantly circumferentially spaced around said outer peripheral surface, so that, when said engagement projection is inserted into said engagement opening, free ends of said small protrusions are elastically urged against said inner peripheral surface of said engagement opening in said first member by the elasticity of said engagement projection, portions of said outer peripheral surface supporting said small protrusions having therein notches providing said radial elasticity, said engagement projection having a radial thickness at each said small protrusion that is greater than a radial thickness of all portions of said engagement projection not having small protrusions.

20. A centering and connecting structure according to claim 19, wherein said first and second members are fixed relative to each other axially by urging an end surface of one of said first and second members against a shoulder portion on the other of said first and second members.

21. A centering and connecting structure according to claim 19, wherein said first and second members are fixed relative to each other circumferentially by a key, thereby enabling a strong torque to be imparted between said first and second members.

22. A centering and connecting structure according to claim 19, wherein said engagement opening of said first member is an engagement opening of a vane rotor, and said engagement projection of said second member is an engagement projection provided on a tip end of a shaft, and further comprising a cap having a shoulder portion engaged with an end surface of said vane rotor and a threaded portion threaded into a threaded hole formed in an end surface of said shaft.

23. A centering and connecting structure according to claim 19, wherein said engagement opening of said first member is an engagement opening of a first fixed member of a pump, and said engagement projection of said second member is an engagement projection formed in a disc portion of a shaft support member for supporting a shaft, and an end surface of said disc portion of said shaft support member being urged and fixed against a shoulder portion of said engagement opening by bolts passing through said disc portion and threaded into threaded holes of said first fixed member.

24. A centering and connecting structure wherein an engagement projection formed on a second member is fitted into an engagement opening formed in a first member, whereby a central axis of said engagement opening is aligned with a central axis of said engagement projection and the alignment is always maintained regardless of any difference between thermal expansions of said first and second members, said structure further comprising:

said engagement projection having an outer peripheral surface substantially corresponding to an inner peripheral surface of said engagement opening and having a dimension slightly smaller than that of said engagement opening, and said engagement projection having an inner cavity providing said engagement projection with radial elasticity;

two sets of small protrusions, said sets being spaced axially of said central axes, each said set including a plurality of said small protrusions extending radially from either one of said outer peripheral surface of said engagement projection of said second member and said inner peripheral surface of said engagement opening in said first member to the other and equidistantly circumferentially spaced around said one of said outer peripheral surface and said inner peripheral surface, so that, when said engagement projection is inserted into said engagement opening, free ends of said small protrusions are elastically urged against the said member having no small protrusions by the elasticity of said engagement projection; and said first and second members being fixed relative to each other circumferentially by a key, thereby enabling a strong torgue to be imparted between said first and second members.

25. A centering and connecting structure according to claim 24, wherein said plurality of small protrusions extend radially outwardly from said outer peripheral surface of said engagement projection, and portions of said outer peripheral surface supporting said small protrusions have therein notches providing said radial elasticity.

26. A centering and connecting structure according to claim 25, wherein respective said notches are provided on opposite sides of each of said small protrusions.

27. A centering and connecting structure according to claim 26, wherein said notches extend axially only.

28. A centering and connecting structure according to claim 25, wherein said notches extend axially only.

29. A centering and connecting structure according to claim 24, wherein said first and second members are fixed relative to each other axially by urging an end surface of one of said first and second members against a shoulder portion on the other of said first and second members.

30. A centering and connecting structure according to claim 24, wherein said engagement opening of said first member is an engagement opening of a vane rotor, and said engagement projection of said second member is an engagement projection provided on a tip end of a shaft, and further comprising a cap having a shoulder portion engaged with an end surface of said vane rotor and a threaded portion threaded into a threaded hole formed in an end surface of said shaft.

31. A centering and connecting structure according to claim 24, wherein said engagement opening of said first member is an engagement opening of a first fixed member of a pump, and said engagement projection of said second member is an engagement projection formed in a disc portion of a shaft support member for supporting a shaft, and an end surface of said disc portion of said shaft support member being urged and fixed against a shoulder portion of said engagement opening by bolts passing through said disc portion and threaded into threaded holes of said first fixed member.

32. A centering and connecting structure wherein the engagement projection formed on a second member is fitted into an engagement opening formed in a first member, whereby a central axis of said engagement opening is aligned with a central axis of said engagement projection and the alignment is always maintained regardless of any difference between thermal expansions of said first and second members, said structure further comprising:

said engagement projection having an outer peripheral surface substantially corresponding to an inner peripheral surface of said engagement opening and having a dimension slightly smaller than that of said engagement opening, and said engagement projection having an inner cavity providing said engagement projection with radial elasticity;

two sets of small protrusions, said sets being spaced axially of said central axes, each said set including a plurality of said small protrusions extending radially from either one of said outer peripheral surface of said engagement projection of said second member and said inner peripheral surface of said engagement opening in said first member to the other and equidistantly circumferentially spaced around said one of said outer peripheral surface and said inner peripheral surface, so that, when said engagement projection is inserted into said engagement opening, free ends of said small protrusions are elastically urged against the said member having no small protrusions by the elasticity of said engagement projection; and said engagement opening of said first member being an engagement opening of a vane rotor, and said engagement projection of said member being an engagement projection provided on a tip and of a shaft, and further comprising a cap having a shoulder portion engaged with an end surface of said vane rotor and a threaded portion threaded into a threaded hole formed in an end surface of said shaft.

33. A centering and connecting structure according to claim 32, wherein said plurality of small protrusions extend radially outwardly from said outer peripheral surface of said engagement projection, and portions of said outer peripheral surface supporting said small protrusions have therein notches providing said radial elasticity.

34. A centering and connecting structure according to claim 33, wherein respective said notches are provided on opposite sides of each of said small protrusions.

35. A centering and connecting structure according to claim 34, wherein said notches extend axially only.

36. A centering and connecting structure according to claim 33, wherein said notches extend axially only.

37. A centering and connecting structure according to claim 32, wherein said first and second members are fixed relative to each other axially by urging an end surface of one of said first and second members against a shoulder portion on the other of said first and second members.

38. A centering and connecting structure wherein an engagement projection formed on a second member is fitted into an engagement opening formed in a first member, whereby a central axis of said engagement opening is aligned with a central axis of said engagement projection and the alignment is always maintained regardless of any difference between thermal expansions of said first and second members, said structure further comprising:

said engagement projection having an outer peripheral surface substantially corresponding to an inner peripheral surface of said engagement opening and having a dimension slightly smaller than that of said engagement opening, and said engagement projection having an inner cavity providing said engagement projection with radial elasticity;

two sets of small protrusions, said sets being spaced axially of said central axes, each said set including a plurality of said small protrusions extending radially from either one of said outer peripheral surface of said engagement projection of said second member and said inner peripheral surface of said engagement opening in said first member to the other and equidistantly circumferentially spaced around said one of said outer peripheral surface and said inner peripheral surface, so that, when said engagement projection is inserted into said engagement opening, free ends of said small protrusions are elastically urged against the said member having no small protrusions by the elasticity of said engagement projection; and said engagement opening of said first member being an engagement opening of a first fixed member of a pump, and said engagement projection of said second member being an engagement projection formed in a disc portion of a shaft support member for supporting a shaft, and an end surface of said disc portion of said shaft support member being urged and fixed against a shoulder portion of said engagement opening by bolts passing through said disc portion and threaded into threaded holes of said first fixed member.

39. A centering and connecting structure according to claim 38, wherein said plurality of small protrusions extend radially outwardly from said outer peripheral surface of said engagement projection, and portions of said outer peripheral surface supporting said small protrusions have therein notches providing said radial elasticity.

40. A centering and connecting structure according to claim 39, wherein respective said notches are provided on opposite sides of each of said small protrusions.

41. A centering and connecting structure according to claim 40, wherein said notches extend axially only.

42. A centering and connecting structure according to claim 39, wherein said notches extend axially only.

* * * * *

UNITED STATES PATENT AND TRADEMARK OFFICE
CERTIFICATE OF CORRECTION

PATENT NO. : 5,730,546
DATED : March 24, 1998
INVENTOR(S) : Hiroyuki KATO et al.

Figure 8:
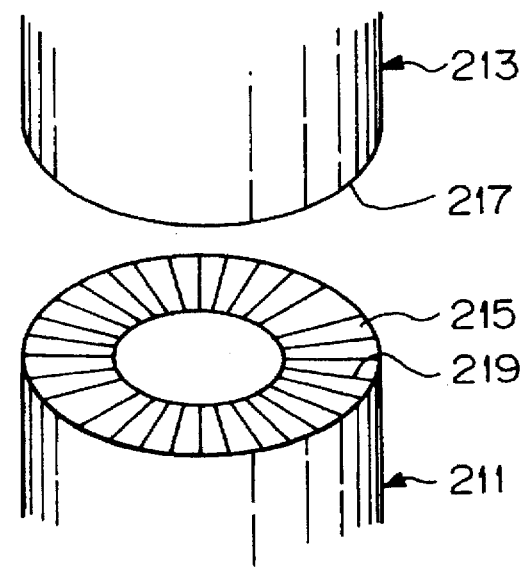
FIG. 8 is a perspective view showing another conventional technique.

It is certified that error appears in the above-identified patent and that said Letters Patent is hereby corrected as shown below:

Column 1, line 21, change "a Curvic coupling" to "a coupling as shown in Fig. 8".

Column 1, lines 39-40, change "the Curvic coupling, as shown in Fig. 8" to "the coupling as shown in Fig. 8".

Signed and Sealed this

Twenty-fourth Day of November, 1998

Attest:

BRUCE LEHMAN

Attesting Officer

Commissioner of Patents and Trademarks